United States Patent
Hwang et al.

(10) Patent No.: US 8,469,563 B2
(45) Date of Patent: Jun. 25, 2013

(54) TURN-INDICATOR LIGHT MODULE FOR A VEHICLE MIRROR ASSEMBLY AND VEHICLE MIRROR ASSEMBLY COMPRISING A TURN-INDICATOR LIGHT MODULE

(75) Inventors: Hyok-Joo Hwang, Bucheon (KR); Kwang-Ryeol Park, Incheon (KR)

(73) Assignee: SMR Patents S.a.r.l., Luxembourg (LU)

( * ) Notice: Subject to any disclaimer, the term of this patent is extended or adjusted under 35 U.S.C. 154(b) by 266 days.

(21) Appl. No.: 12/980,483

(22) Filed: Dec. 29, 2010

(65) Prior Publication Data

US 2011/0157907 A1 Jun. 30, 2011

(30) Foreign Application Priority Data

Dec. 29, 2009 (EP) .................................. 09016089

(51) Int. Cl.
*B60Q 1/26* (2006.01)
(52) U.S. Cl.
USPC ........... 362/494; 362/459; 362/487; 362/545; 340/475
(58) Field of Classification Search
USPC ............... 362/459, 487, 494, 227, 234, 235, 362/249.01, 545; 340/475
See application file for complete search history.

(56) References Cited

U.S. PATENT DOCUMENTS

| | | | |
|---|---|---|---|
| 7,134,772 B2 | 11/2006 | Furuya et al. | |
| 7,225,464 B2 | 5/2007 | Satyavolu et al. | |
| 2005/0190465 A1* | 9/2005 | Henion et al. | 359/864 |
| 2005/0243568 A1 | 11/2005 | Rodriguez Barros et al. | |

FOREIGN PATENT DOCUMENTS

| | | |
|---|---|---|
| DE | 20011341 | 9/2000 |
| DE | 20114989 | 11/2001 |
| DE | 10058659 | 5/2002 |
| DE | 10239839 | 3/2004 |
| JP | 2006205785 | 8/2006 |
| JP | 2009295552 A | 12/2009 |
| KR | 100742616 B1 | 7/2007 |

OTHER PUBLICATIONS

European Search Report for application No. EP 09 01 6089 dated Mar. 26, 2010.

* cited by examiner

*Primary Examiner* — Stephen F Husar
*Assistant Examiner* — Meghan Dunwiddie
(74) *Attorney, Agent, or Firm* — Reising Ethington PC

(57) ABSTRACT

A turn-indicator light module for an external rear view mirror assembly has at least one or more light emitting sources mounted on one or more printed circuit boards (PCBs). A reflector and a front housing unit create a lens. At least a major portion of the light module follows a portion of said outer contour of the mirror assembly in the driving direction. The PCB is arranged with respect to the reflector to emit light indirectly by light reflection by the reflector along the major portion of the lens portion of the front housing unit.

13 Claims, 14 Drawing Sheets

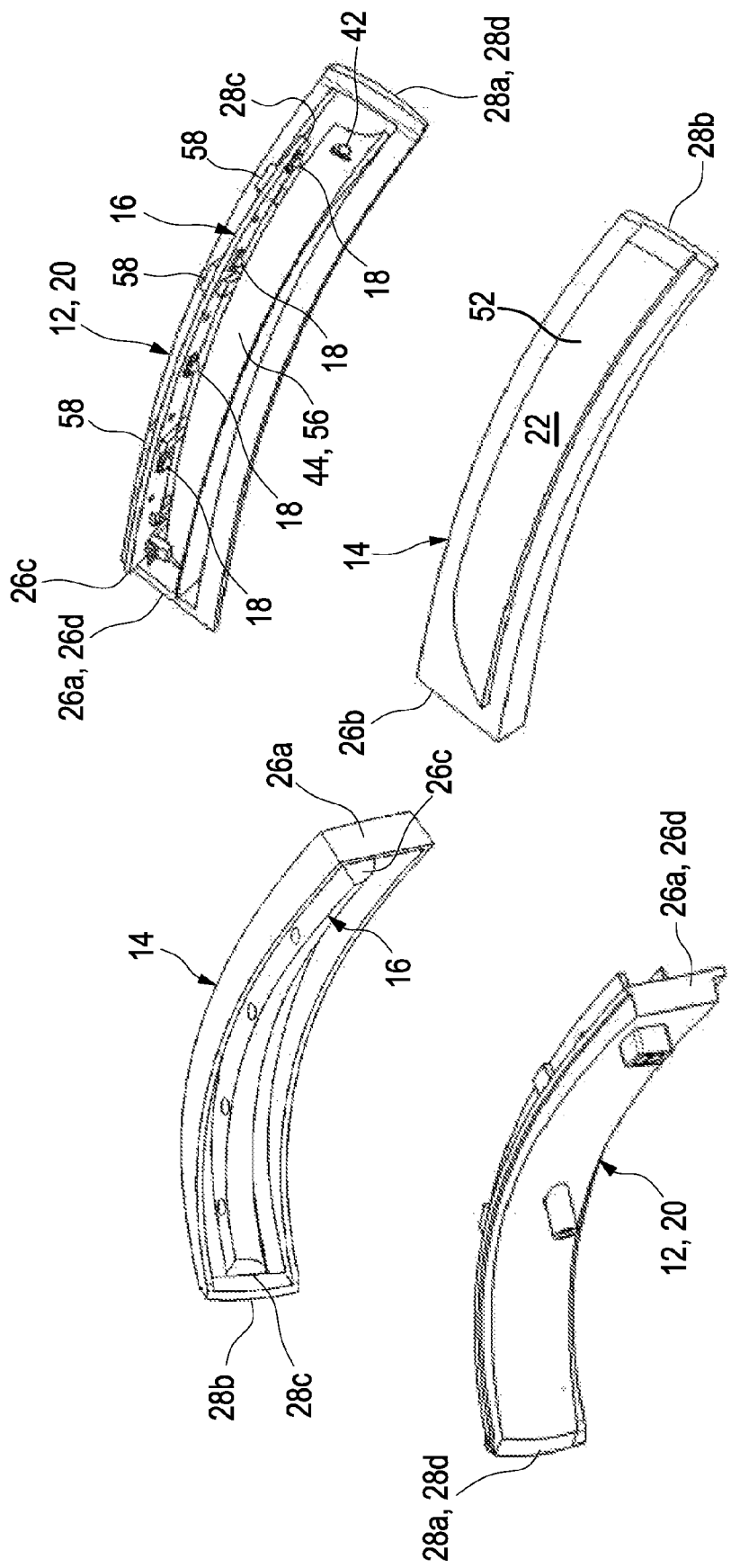

TURN-INDICATOR LIGHT MODULE FOR A VEHICLE MIRROR ASSEMBLY AND VEHICLE MIRROR ASSEMBLY COMPRISING A TURN-INDICATOR LIGHT MODULE

The invention is based on a priority patent application EP 09016089.6 which is hereby incorporated by reference.

BACKGROUND ART

1. Field of the Invention

The invention pertains to a turn-indicator light module for a vehicle mirror assembly. More particularly, the invention pertains to a vehicle mirror assembly having a turn-signal light module having at least one light source directly away from the side of the motor vehicle.

2. Description of the Related Art

Modern vehicles are equipped with different turn indicator light modules for signaling a turn maneuver to neighboring drivers thus enhancing passive safety of the vehicle and the surrounding traffic. For instance multiple forward and backward directed turn indicator lights and also separate sideward directed turn indicator lights signal an intended turn maneuver of a vehicle to following vehicles, oncoming vehicles and pedestrians so that they are prepared for a sudden driving direction change of the vehicle. Well known turn indicator light modules comprise one or several blinking light sources in a housing, which directly emit light outwards to the surrounding traffic. Directly emitted light can cause blending effects to drivers and pedestrians and suffers from a non-uniform light distribution such that the turning light signal can not be seen in all directions with a uniform intensity and brightness. For instance a turn indicator light positioned in a different height as a driver's position of a neighboring vehicle can often not be seen clear enough by the driver, e.g. a turning light of a truck which is close to a low riding sports car can often be overseen by the driver of the sports car.

Various external rear-view side mirrors enclosing light modules are disclosed in US 2005/0243568 A1 in which light guides are used for transporting light from a light source at one side of the light guide to the other side of the light guide.

In U.S. Pat. No. 7,225,464 B2, a turn indicator light module is integrated in a rear view mirror of a vehicle and includes one or several light emitting sources for signaling a turn intend towards a driving direction of the vehicle for informing oncoming vehicles and also for signaling a turn intend towards a sideward direction of the vehicle for informing pedestrians and crossing vehicles of a turning intend. The light emitting sources emit light directly towards the surrounding traffic, using light guiding elements and one or several lenses cause non-uniform light distribution and blending effects.

A German disclosure identified by DE 102 39 839 describes a turn indicator light module being integrated in an outside mirror of a vehicle wherein at least a light emitting source emits a signal light indirectly via a reflector surface towards a driving direction of a vehicle. The light emitting source is not visible from the outside.

Another German disclosure identified by DE 200 11 341 U1 teaches a light emitting module for an outside mirror of a vehicle comprising a turning light indicator element and a separate near field illumination element. The turning light indicator element comprises a reflector and at least one light emitting source which emits light indirectly to a sideward direction of the vehicle by reflection via the reflector.

In a Japanese disclosure identified by JP 2006 205785 A, a door field illumination module is described which is integrated in an outside mirror of a vehicle and which illuminates a lower peripheral region of a vehicle door by directly emitted and indirectly reflected light of a light source and a reflector assembly.

SUMMARY OF THE INVENTION

It is an object of the invention to provide an improved and compact turn-indicator light module for an external rear view mirror assembly of a vehicle which does not generate blending effects, has a uniform light distribution and can be recognized in different directions with the same brightness and quality. Another object of the invention is to provide a vehicle mirror assembly comprising a non-blending and uniform light distributing turn-indicator light module.

The objects are achieved by the features of the independent claims. The other claims, the description and the drawings disclose advantageous embodiments of the invention.

According to a first aspect of the invention a turn-indicator light module for an external rear view mirror assembly is proposed. The view mirror assembly has an outer contour, wherein the turn-indicator light module comprises a rear housing unit, at least one or more light emitting sources mounted on one or more printed circuit boards (PCBs), at least one reflector unit and a front housing unit comprising a lens portion. At least a major portion of a longitudinal extension between a first end and a second end opposite of the first end of the rear housing unit, front housing unit, reflector unit and the PCB, respectively, follows a portion of the outer contour in driving direction of the rear view mirror assembly. The PCB with the light emitting source is arranged with respect to the reflector unit to emit light indirectly by light reflection of the reflector unit along the major portion of their longitudinal extension through the lens portion of the front housing unit to the driving direction and to a sideward direction. The turn-indicator light module comprises at least one separate light emitting source which is provided for directly emitting light in said sideward direction for indicating a turning intend to pedestrians and crossing vehicles.

The turn-indicator light module thereby has a visible outer contour of the lens portion following the contour of the mirror assembly in driving direction and is thereby seamlessly integrated in the housing of the external rear view mirror. Since all components of the module basically follow in their longitudinal extension the outer contour of the mirror in driving direction the module can be build in a compact small-sized way thus leaving enough space in the mirror housing for mirror related elements like mirror driving motor and mechanism, mirror heating device, mirror washing device, self dimming device, etc. Thus, a mirror contour oriented longitudinal shape of the module provides a small and compact external mirror housing. The at least one light emitting source is arranged on a PCB for providing a blinking light indicating a turn intend. The PCB can be equipped with additional electronic components such as resistors, several light emitting sources, diodes, transistors, integrated circuits, wires etc.

The one separate light emitting source is provided for directly emitting light in the sideward direction. Providing a separate light emitting source for directly emitting light rays in a sideward direction of the vehicle ensures to indicate a turning intend to pedestrians and to crossing vehicles, whereby a wider range of illumination and higher level of brightness can be achieved in the sideward direction such that the signaling effect in the sideward direction can be increased and driving safety can be enhanced for both, vehicle and pedestrians.

The light of the light emitting source is emitted indirectly through a lens portion of the front housing unit of the module with the help of a reflection unit redirecting the light path of the light emitting source towards the lens portion. In this way the rays from the light emitting source like light bulb, LED etc. are reflected by the reflector unit and are emitted to the front side (driving direction), sideward direction, and can also be emitted to a downward or rear side of the vehicle. As such the light emitting source itself can be made invisible to the outside and only indirectly reflected light is emitted by the module. In consequence a uniform light dispersion towards a driving direction and towards a sideward direction of the vehicle is achieved without danger of blending of other persons. Furthermore an elegant impression of the interior of the module is achieved, wherein only a reflecting surface is visible, but none of the usual technical devices like lamps, lenses, light guiding elements etc. can be seen from the outside. The indirect light emission gives a sense of beauty to an observer and let the module appear as a garnish element of the vehicle. The lens portion can be made of transparent acrylic or polycarbonate (PC) so that the inside of the module, especially the reflecting unit can be seen clearly. The outside surface of the lens portion can also be treated to have a lumpy surface, so that when the light emitting source is turned off, the surface of the lens portion shines in a cloudy color and does not show any irregularities, whereby only a reflecting surface of the reflecting unit remains visible through the lens portion.

Advantageously, the light emitting source of the turn-indicator light module can be a LED light source. LED based light emitting sources have a very small dimension, can be arranged on a PCB in a compact way, are cheap, have a low electric power consumption and a very high durability. Furthermore LEDs are available in a wide variety of colors and in different light intensity ranges.

According to a favorable embodiment the PCB can be mounted in the upper or lower portion of the housing and the light emitting source emits light in a downward respectively upward direction of the module. Additionally but also independently it is also favourable to form a longitudinal bended and cross-sectional curved reflecting surface of the reflecting unit which is adapted to reflect light from an upward/downward direction to the driving and the sideward direction. Arranging the light emitting sources along the longitudinal extension of the PCB offers to arrange multiple light emitting sources along the PCB, especially LEDs which creates a uniform light distribution along the reflection unit. Furthermore arranging the PCB in the upper or lower portion of the housing of the module, whereby the light emitting sources emit light in a downward respectively upward direction, offers the possibility to define a preferred direction of light emittance in a upward or downward direction—so that e.g. a mirror of a truck can be provided whereby the turning light of which shines in a forward, sideward and downward direction.

Furthermore it is also conceivable that a downward oriented emittance of the emitting light source can additionally be used as a near-field illumination of a vehicle door by deviating of the reflecting unit in case of an opened door, so that light of the light emitting source shines through a lens or an opening of the undersurface of the module and the mirror housing onto the street. Thereby a small motor can be used for deviating of the reflecting unit which is coupled with a door open sensor, and the light emitting source is turned on and the reflecting unit is deviated if a door near to the external rear view mirror is opened. The reflection unit has favorably a bended longitudinal shape, which basically follows the outer contour of the mirror and has a curved cross section which defines the angle and direction of the reflected light rays. By varying the cross-sectional shape or rotating the reflecting element along its longitudinal axis the angle and direction of the emitted turning light shining through the lens portion can favorably be adapted.

In general one light emitting source can be used for indicating a turning light signal. Advantageously at least two, preferably three to seven light emitting sources can preferably be even spaced mounted particularly in a matrix type arrangement along the longitudinal extension on the PCB. The arrangement of multiple light emitting sources offer lower power consumption for each light emitting source, longer durability, and more uniform and homogeneous light distribution. Arranging light sources in a matrix type, which means placing one or several rows of light emitting sources in a parallel equidistant or non-equidistant way offers compact positioning of light sources, also of light emitting sources of different colors and intensities, and enables concentrating light emitting sources in different densities, e.g. in a higher density towards the sideward direction of the vehicle for emitting light directly or indirectly in said sideward direction for warning pedestrians and crossing traffic.

According to another favorable embodiment at least one separate light emitting source can be provided for directly emitting light in the sideward direction. Additionally the one or several separate light emitting sources can be mounted on a separate PCB and electrically coupled to the PCB by wire harness. Providing a separate light emitting source for directly emitting light rays in a sideward direction of the vehicle ensures to indicate a turning intend to pedestrians and to crossing vehicles, whereby a wider range of illumination and higher level of brightness can be achieved in the sideward direction such that the signaling effect in the sideward direction can be increased and driving safety can be enhanced for both, vehicle and pedestrians. Favorably such a separate light emitting source is fixed onto a separate PCB connected to the main PCB via a wire or wire harness such that the separate PCB can be exactly aligned in the sideward direction and does not cause a blending effect in the driving direction.

According to a favorable embodiment the one or several separate light emitting source can be fixed or mounted onto a separate PCB and electrically connected to the main PCB via a wire or wire harness such that the separate PCB can be exactly aligned in the sideward direction and does not cause a blending effect in the driving direction.

The light of the light emitting source is emitted indirectly using at least one reflecting surface of a reflector unit. Advantageously the reflector unit can comprise a homogeneous reflecting surface, having a mirror-like effect for reflecting light in the driving and sideward direction. Alternatively it is also favourable that the reflector unit can comprise a grooved reflecting surface for an optical diffusion of the reflected light. Either way it is also preferably to use an aluminized surface as reflecting surface of the reflector unit. In consequence the surface of the reflecting unit can be made glossy and unruffled and alternatively or partially can be designed with a grooved surface for optical diffusion of the reflected light. Especially a grooved surface can enhance light diffusion for an explicit directing of light rays in a certain radiation direction or radiation angle. An aluminized surface provides a glare-free-reflecting surface having a highly diffusing effect and enhances a garnished impression of the turn-indicator light module.

According to a preferred embodiment the lens portion of the front housing unit can fill the space between the PCB and the reflector unit such that the light emitting source directly emits light into the lens portion. Thus the space between PCB with light emitting source and reflecting unit is filled with material of the lens portion which enhances thickness and durability of the lens and also guides the light within the lens and reduces the number of material interfaces for the light transmission.

If the transparent material of the lens portion fills the space between the PCB and the reflector unit it is highly advantageous to integrally form the reflecting surface of the reflecting unit onto an inner surface of the lens portion of the front housing unit. According to this embodiment the reflecting unit is integrally formed with the lens portion thus eliminating the need for a separate reflection unit which saves production time and cost. Furthermore the shape of the inner surface of the lens portion provides the reflecting surface of the reflecting unit which enhances the optical characteristics of the turn-indicator light module and reduces problems due to pollution or damaging of the reflecting surface.

Alternatively to aforementioned forming of the reflecting surface onto the inner surface of the front housing unit it can also be advantageous to integrally form the reflecting surface of the reflecting unit on an inner surface of the rear housing unit. Also in this embodiment a separate reflecting unit can be omitted and the reflecting surface of the reflecting unit is provided by an inner surface of the rear housing unit which saves assembly time and cost.

In case that the lens portion of the front housing unit fills the space between the PCB and the reflector unit, and the reflecting surface is integrally formed on an inner surface of the rear housing unit, the inner surface of the lens portion of the front housing unit and the inner reflecting surface of the rear housing unit can favorably define an uniform gap between both surfaces, and the lens portion comprises at least one cavity in which a light emitting source extends for optical coupling of light emitting source with lens portion. Thus the light of the light emitting sources is directly coupled via the cavity in the material of the lens portion, and is reflected by the inner surface of the rear housing unit. The uniform gap ensures an defined optical interface between lens portion and reflecting surface and prevents the reflecting surface from dirt and pollution.

According to a favorable embodiment, the lens portion can have an outside to inside transparent outer surface, or the lens portion can have a semi-transparent outer surface, preferably an outer surface being coated with chromium or aluminum plating, having a light transmittance from inside to outside between 15-50%. A semi-transparent lens portion enables light transmittance of indirectly emitted light from the light emitting source reflected by the reflecting unit whereby seen from the outside only the reflecting surface of the reflecting element are visible A transparent surface offers a direct view onto the reflecting surface and a semi-transparent surface being coated with a chromium or aluminum plating enhances an elegant impression as ornamental or garnish element of the vehicle. A light transmittance of 15-50% is sufficient for indicating a turning intend but does not expose the interior technical configuration of the turn-indicator light module to the outside.

According to a preferred embodiment, the rear housing unit, the PCB, the reflector unit and the front housing unit can be assembled together using snap-in connectors, comprising grooves and protrusions. Snap in connectors provide a tool-free assembly of the housing of the turn-indicator light module and allow to maintain and repair the turn-indicator light module fast and easily which saves time and money, especially in case of an outside vehicle mirror being frequently damaged by accidentally touching vehicles.

According to another object of the invention, a mirror assembly of an external rear view mirror is proposed comprising a turn-indicator light module according to any feature described above. Thus the mirror assembly comprises a turn-indicator light module being seamlessly integrated in the outer contour of the mirror assembly, the turn-light indicator comprises one or more light emitting sources emitting light indirectly via at least one reflecting unit and a lens portion to the surrounding traffic in a driving and a sideward direction in a uniform and antiglare manner. In such a way an external rear view mirror is proposed comprising a turn-indicator light module having the above mentioned advantages and benefits.

Favorably the turn-indicator light module can be fixed inside a housing of the mirror assembly using snap-in connectors. Also in this case snap in connectors provide a tool-free assembly of the turn-indicator light module in the housing of the external rear view mirror and allow to maintain and repair the mirror fast and easily which saves time and money, especially in case of an outside mirror being frequently damaged by accidentally touching vehicles.

BRIEF DESCRIPTION OF THE DRAWINGS

The present invention together with the above-mentioned and other objects and advantages may best be understood from the following detailed description of the embodiments, but not restricted to the embodiments, wherein is shown schematically.

DETAILED DESCRIPTION OF THE PREFERRED EMBODIMENTS

Figure 1A:
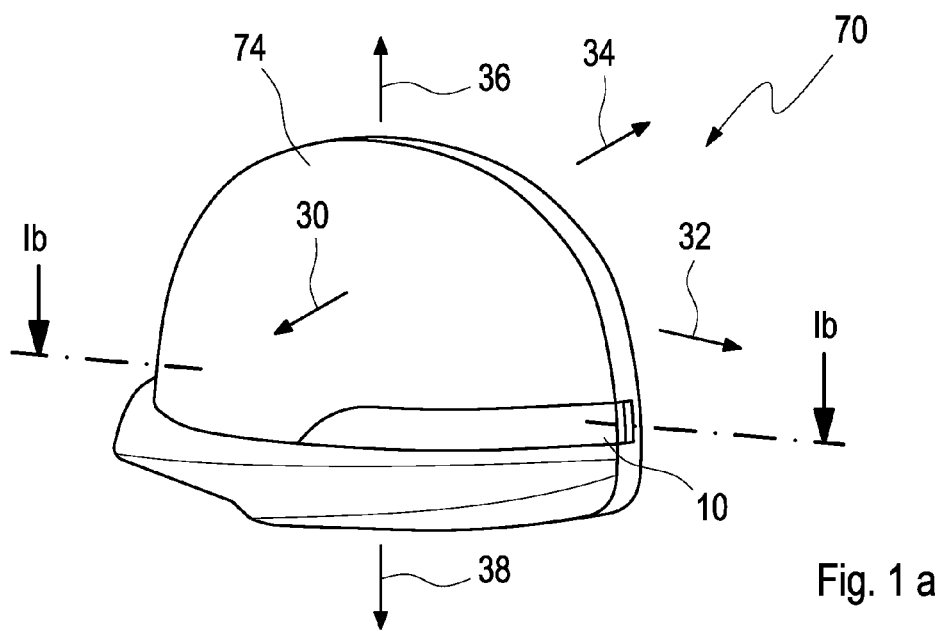
FIG. 1a, 1b a perspective view (FIG. 1a) of a first example embodiment of a mirror assembly with turn-indicator light module and a longitudinal cut through the preferred mirror assembly (FIG. 1b) according to the invention.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

Figure 5:
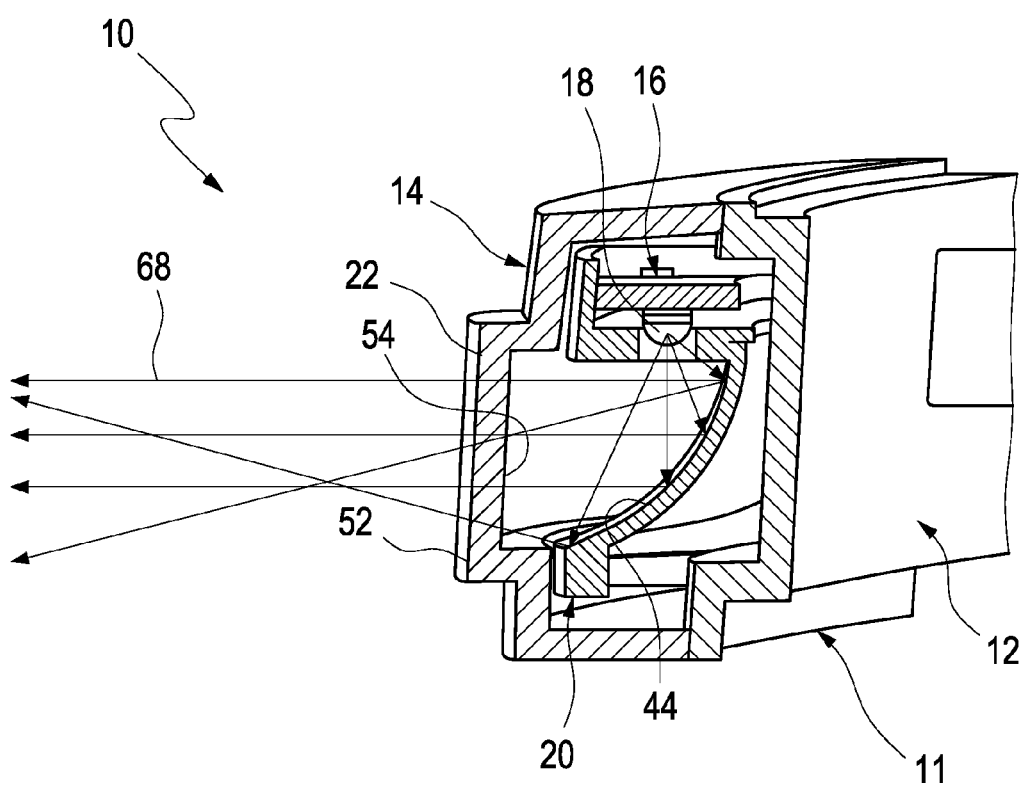
FIG. 5 a schematic representation of light emission of the first example embodiment of a turn-indicator light module according to the invention having an unruffled surface of the reflecting unit.
Figure 6:
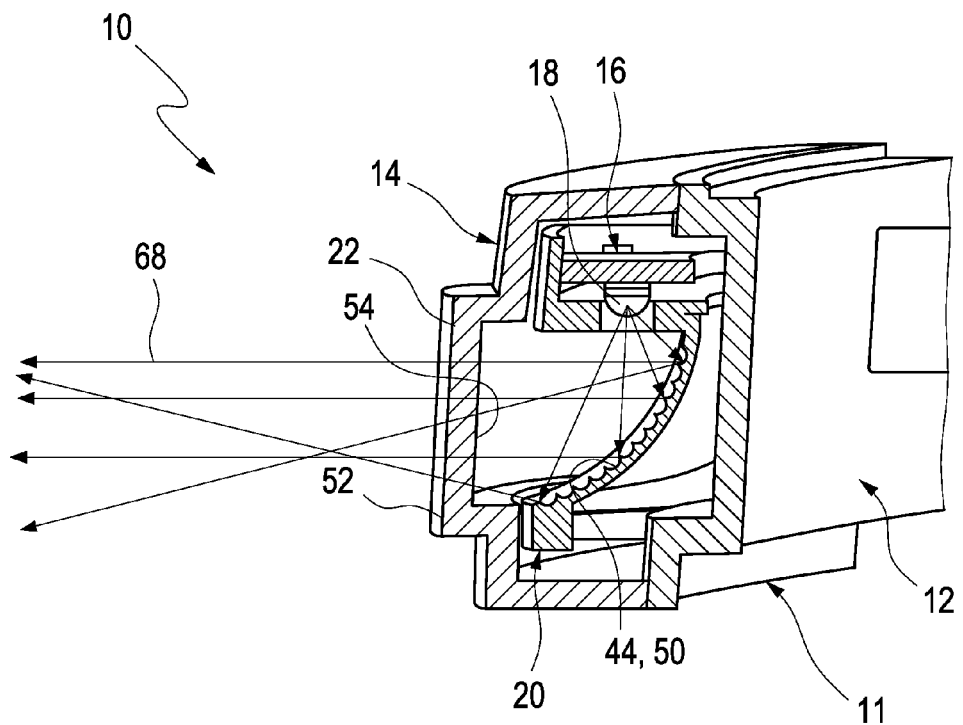
FIG. 6 a schematic representation of light emission of a variant of the first example embodiment of a turn-indicator light module according to the invention having a grooved surface of the reflecting unit.

FIG. 1a to FIG. 5 display constructive details of a first embodiment of a mirror assembly 70 with a turn-indicator light module 10 according to the invention, and FIG. 6 shows a variant of the first embodiment.

Figure 1B:
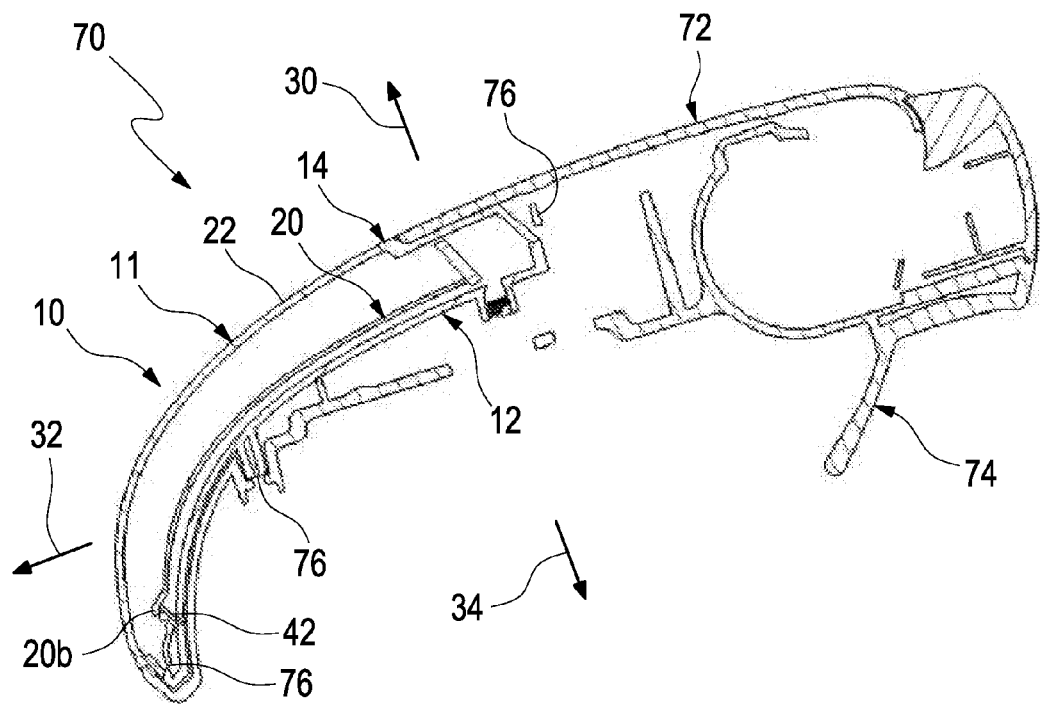
Figure 2:
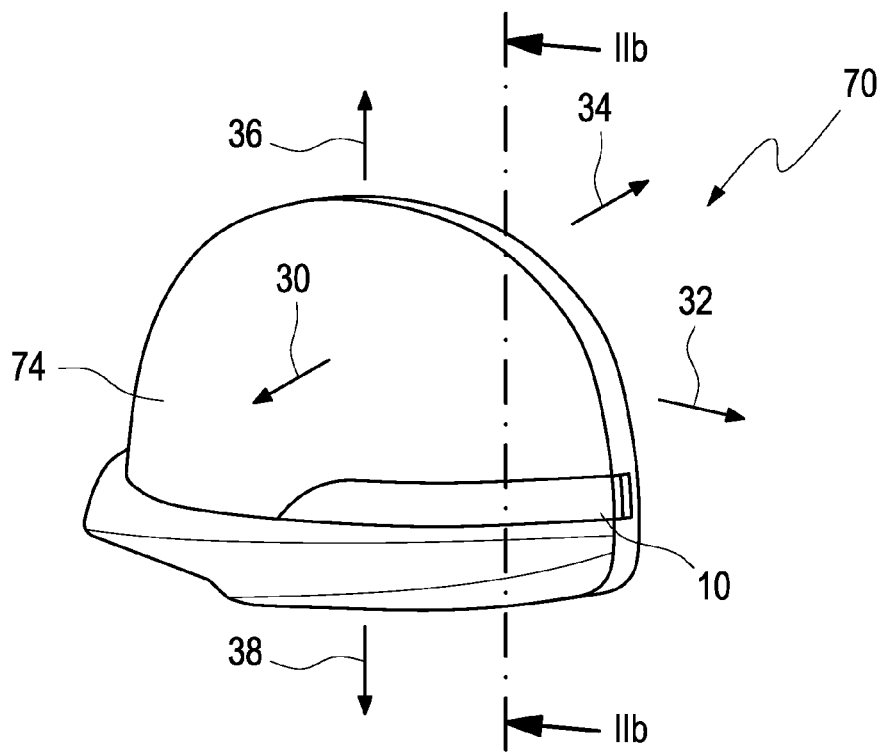
FIG. 2a, 2b a second perspective view (FIG. 2a) of the first example embodiment and a cross-sectional cut through the preferred mirror assembly (FIG. 2b)
Figure 2:
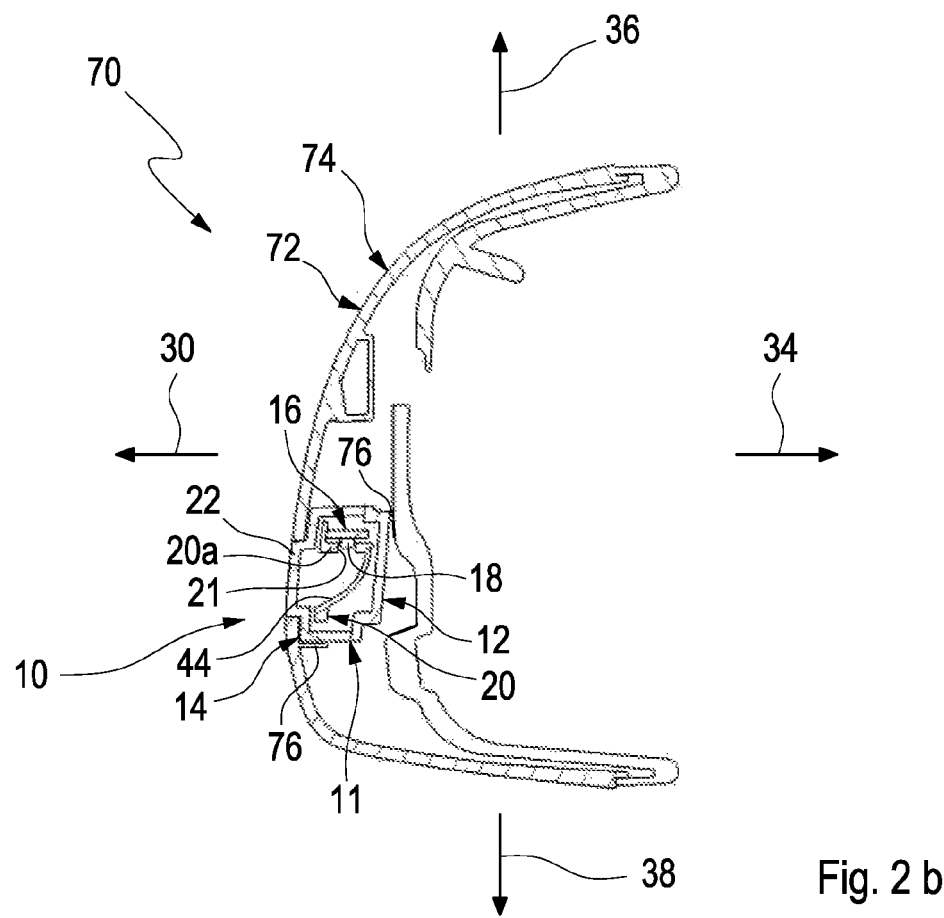
Figure 3:
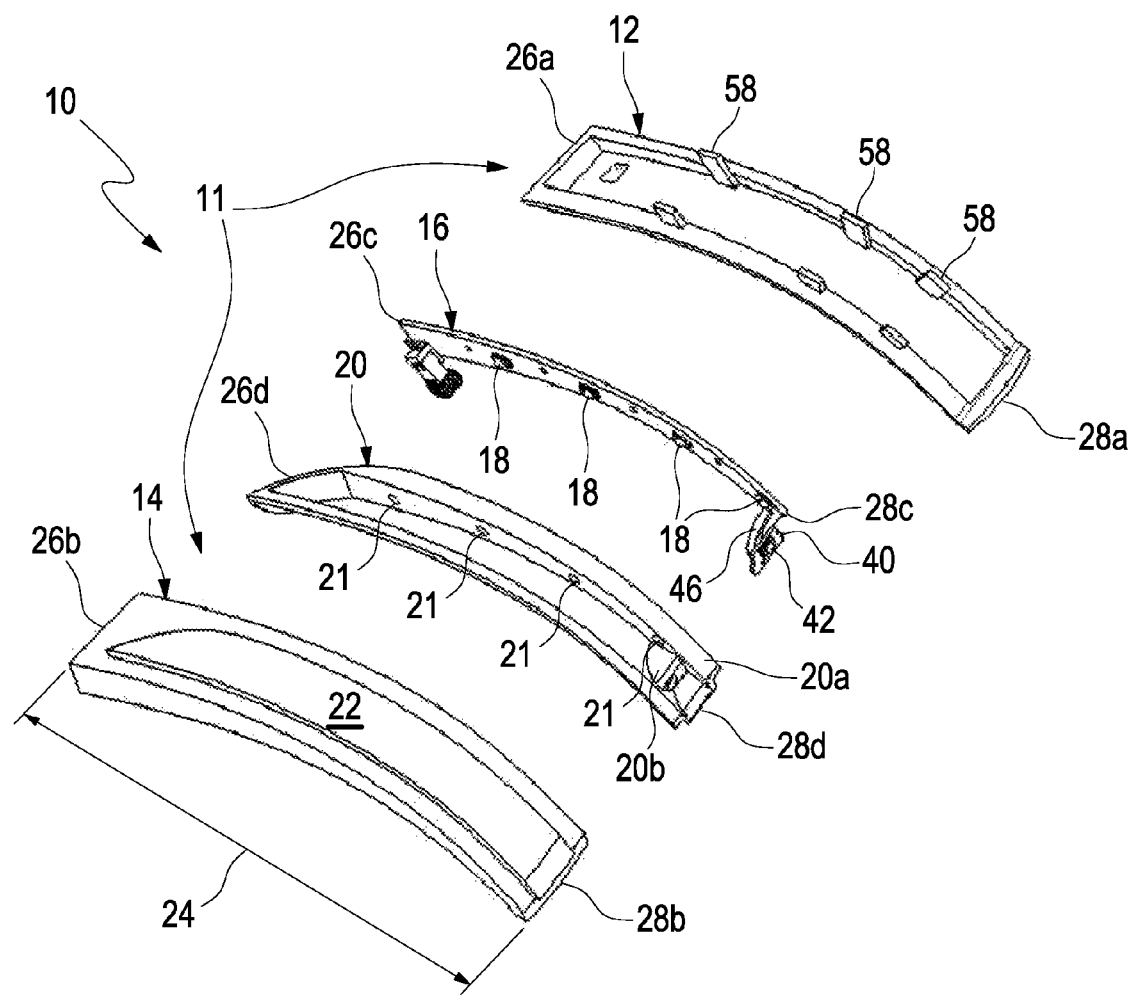
FIG. 3a-3c different exploded views from different directions of an assembly sequence of the first example embodiment of a turn-indicator light module according to the invention.
Figure 3:
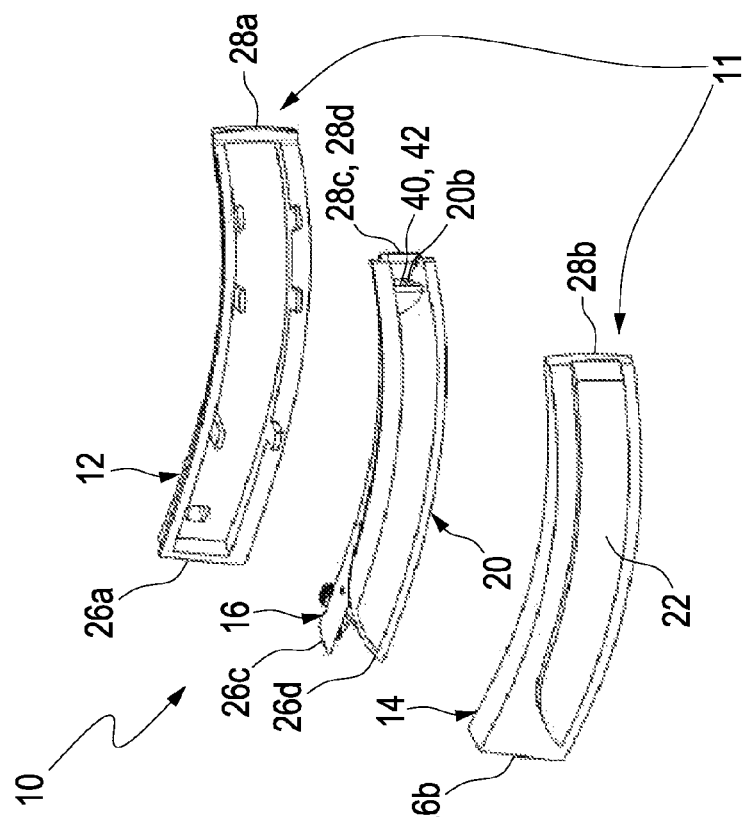
Figure 3:
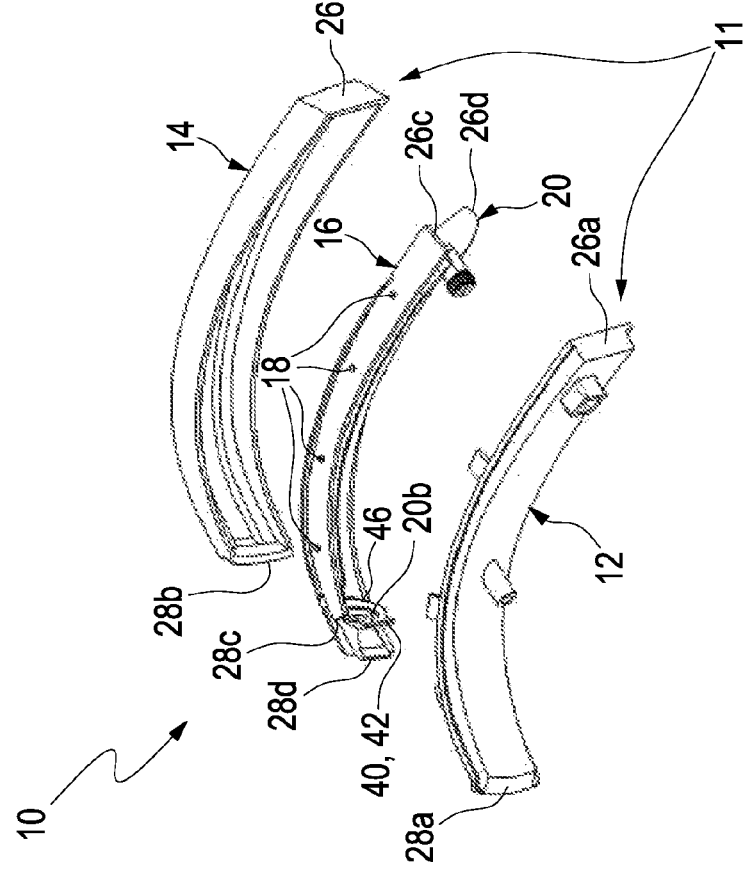

FIGS. 1a, 1b are described in conjunction with FIGS. 2a, 2b. FIGS. 1a and 1b depict a first example embodiment of an external rear view mirror assembly 70 comprising a turn-indicator light module 10. The rear view mirror assembly 70 has an opening on one side for receiving a mirror (not shown) in a mirror housing 74 with an outer contour 72 opposite to the mirror. FIG. 2a, 2b provide a second perspective view (FIG. 2a) of the first embodiment and a cross-sectional cut through the preferred mirror assembly 70 (FIG. 2b) of this embodiment.

Reference numeral 30 refers to a driving direction of a vehicle to which the rear view mirror assembly 70 is attached (i.e. forward direction of the driving vehicle), reference numeral 32 refers to a sideward direction of the rear view mirror assembly 70, which is assigned to an exit of light generated by the turn indicator light module 10. Reference numeral 34 indicates the rear view direction.

Reference numeral 36 refers to an upward direction and reference numeral 38 refers to a downward direction.

The turn-indicator light module 10 comprises a housing 11 consisting of a rear housing unit 12 and a front housing unit 14 which enclose a number of light emitting sources 18, e.g. a light emitting diode (LED), mounted on a printed circuit board 16 (PCB 16, seen in FIG. 2b), a reflector unit 20 for reflecting light of the light emitting sources 18. Only one light emitting source 18 can be seen in the view. The rear housing unit 12 and the front housing unit 14 can be joined together forming the housing 11. The reflector unit has a portion 20 which is provided for an additional light emitting source 42 mounted on a separate PCB 40. Said additional light emitting source 42 is electrically coupled to the PCB 16 by a wire harness 46.

The front housing unit 14 comprises a lens or light pane portion 22 (in the following called lens), which is flush with the contour 72 of the mirror housing 74 (or may at least follows the contour 72 of the mirror housing 74). The front housing unit 14, the rear housing unit 12, the reflector unit 20 and the PCB 16 follow the contour 72 of the mirror housing 74.

In the embodiment shown, said PCB 16 is mounted in the upper portion of the housing 11, wherein the light emitting source 18 emits light in a downward direction 38. The reflector unit 20 has a longitudinal bended and cross-sectional bent reflecting surface 44 adapted to reflect light from a downward direction 38 to said driving 30 and said sideward direction 32. In cross sectional view the shape of the reflecting surface 44 is, for instance, parabolic, elliptical or the like, as can be seen in FIG. 2b.

Alternatively, the PCB 16 can also be mounted in the lower portion of the housing 11 (not shown), wherein the light emitting source 18 emits light in an upward direction 36. The reflector unit 20 has a longitudinal bent and cross-sectional curved reflecting surface 44 and is in this case adapted to reflect light from an upward direction 36 to said driving 30 and said sideward direction 32.

At the part of the reflector unit 20 close to the light emitting source 18, a web 20a is arranged at the reflector unit 20 pointing towards the light emitting elements 18 with an opening 21 for each light emitting source 18 for passing light from the light emitting source 18 to the reflector unit 20.

Inside the mirror housing 74, snap-in connectors 76 are provided for receiving the rear housing unit 12 of the housing 11 for easy mounting of the housing 11.

As shown in detail in the various explosion views in FIGS. 3a, 3b, 3c, a major portion of a longitudinal extension 24 of the rear housing unit 12, the front housing unit 14, the reflector unit 20 and said PCB 16 are bend in a way to follow the overall contour 72 of the mirror housing 74. Whereas FIG. 3a shows the components side by side, FIGS. 3b and 3c show a perspective explosion view of the assembly from the rear housing unit side (FIG. 3b) and from the front housing unit side (FIG. 3c), wherein in FIGS. 3b and 3b the PCB 16 is mounted to the reflector unit 20.

As can be seen in FIG. 3a, the front housing unit 14 comprises the lens portion 22 and extends from a first end 26b to a second end 28b. The next component behind the front housing unit 14 is the reflector unit 20 extending from a first end 26d to a second end 28d with the web 20a comprising openings 21 in conjunction with the positions of the light emitting elements 18 in an assembled state of the housing 11. The next component is the PCB 16 extending from a first end 26c to a second end 28c on which the light emitting sources 18 are mounted. The PCB 16 is mounted crosswise to the height of the front housing unit 14. The last component is the rear housing unit 12 extending from a first end 26a to a second end 26b. The rear housing unit 12 provides snap-in connectors 58 which cooperate with the snap-in connectors 76 inside the mirror housing 74 (FIG. 1a).

The components 14, 20, 16 and 12 follow a portion of said outer contour 72 in driving direction 30 of said external rear view mirror assembly 70, wherein the PCB 16 with the light emitting sources 18 is arranged with respect to said reflector unit 20 to emit light indirectly by light reflection of the reflector unit 20 along the major portion of their longitudinal extension 24 through the lens portion 22 of the front housing unit 14 to said driving direction 30 and to a sideward direction 32.

Figure 4:
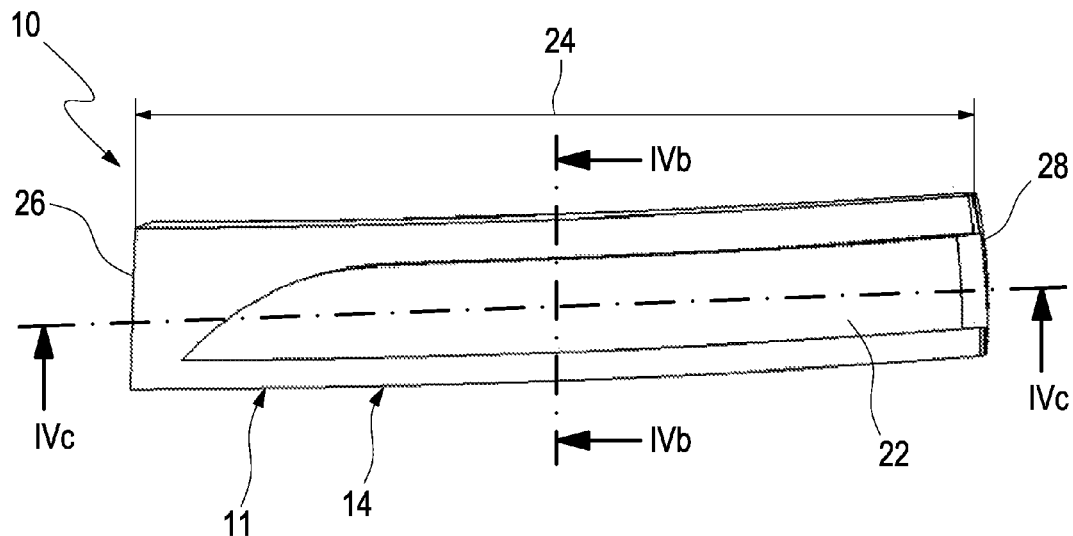
FIG. 4a-4c a perspective front view (FIG. 4a.), a cross-sectional cut (FIG. 4b) and a longitudinal cut (FIG. 4c) of the first example embodiment of a turn-indicator light module according to the invention.
Figure 4B:
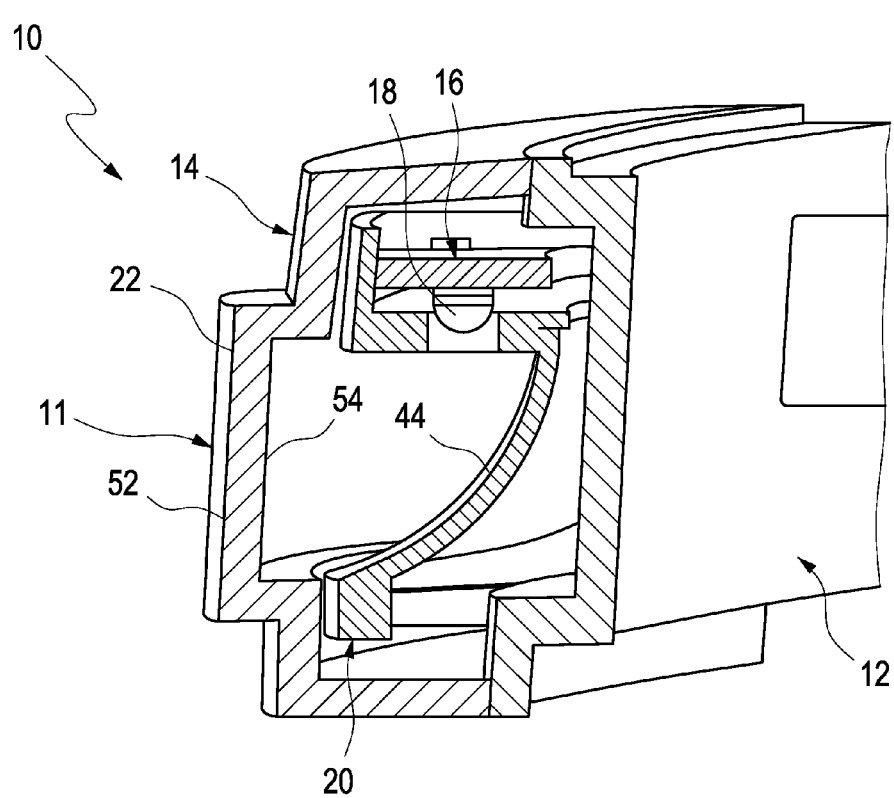
Figure 4:
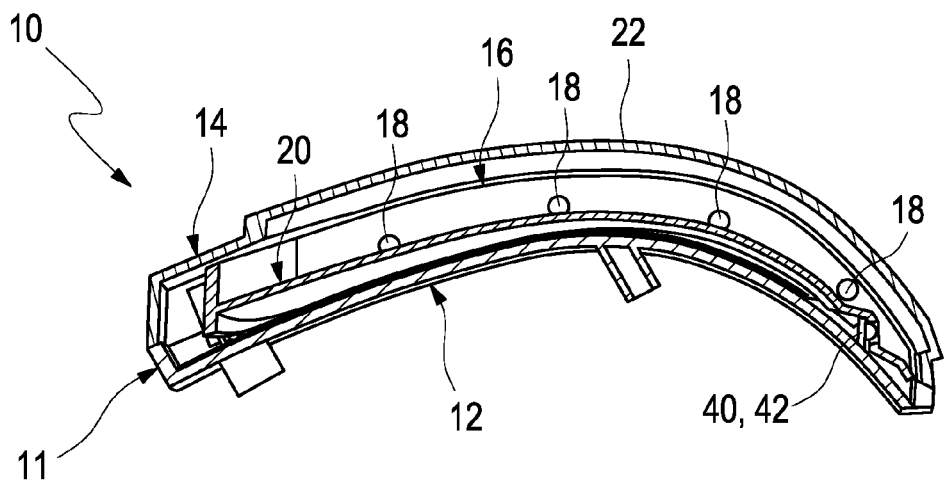

FIGS. 4a-4c illustrate a perspective front view (FIG. 4a), a cross-sectional cut (FIG. 4b) and a longitudinal cut (FIG. 4c) of the housing 11 seen from the front housing unit 12 comprising the lens portion 22.

The light emitting source 18 in assembled state can be seen in FIG. 4b. the light emitting source 18 is hidden behind the web 20a of the reflector unit 20 which is enclosed by the rear housing unit 12 and the front housing unit 14 of the housing 11. The reflecting surface 44 of the reflector unit 20 points towards an inner surface to the lens portion 22. An outer surface 52 of the lens portion 22 is the exit plane of the light emitted in driving and sideward direction 30, 32.

FIG. 5 shows a schematic representation of the first embodiment light emission the rear view mirror assembly 70 according to the invention with the turn-indicator light module 10 having an even, smooth reflecting surface 44 of the reflector unit 20. Contrariwise, FIG. 6 shows a variant with the turn-indicator light module 10 having a ruffled reflecting surface 44 of the reflector unit 20 with grooves 50 in the reflecting surface. The light rays 68 reflected from the reflector surface 44, forming indirectly emitted light rays, are indicated by bent arrows.

Figure 7A:
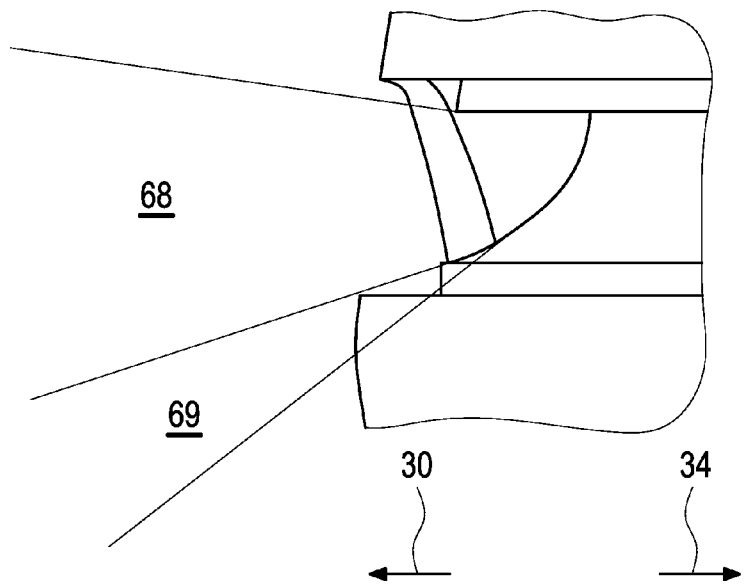
FIG. 7a, 7b a schematic representation of light emission of an external rear view mirror assembly comprising the first embodiment of the turn-indicator light module according to the invention in a zoomed view (FIG. 7a) and in a top view (FIG. 7b)
Figure 7:
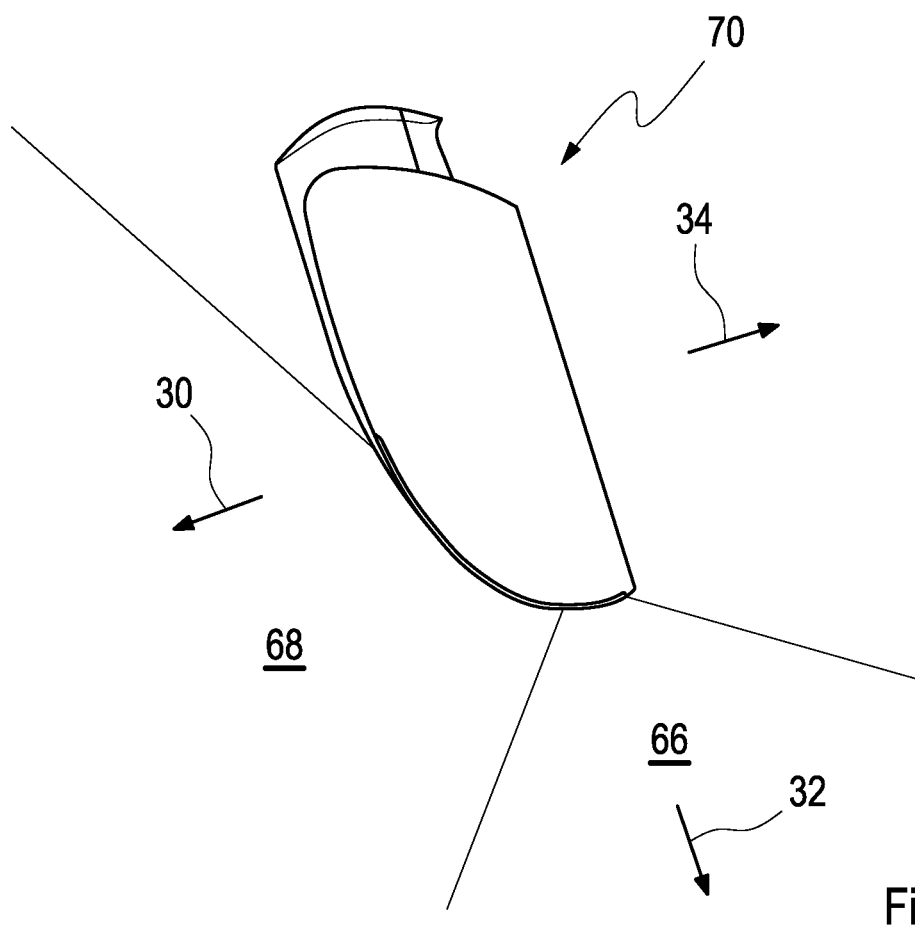
Figure 8:
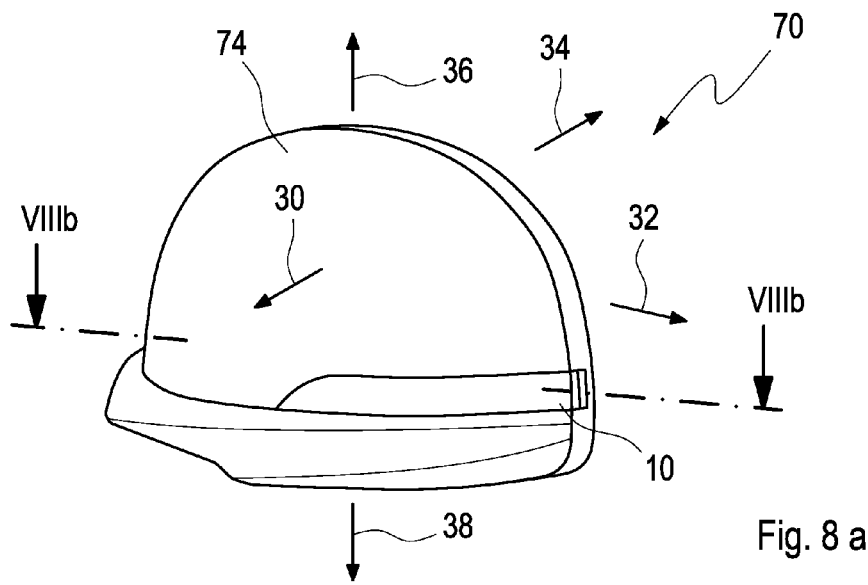
FIG. 8a, 8b a perspective view (FIG. 8a) of a second example embodiment of a mirror assembly with turn-indicator light module and a longitudinal cut through the mirror assembly (FIG. 8b) according to the invention.
Figure 8:
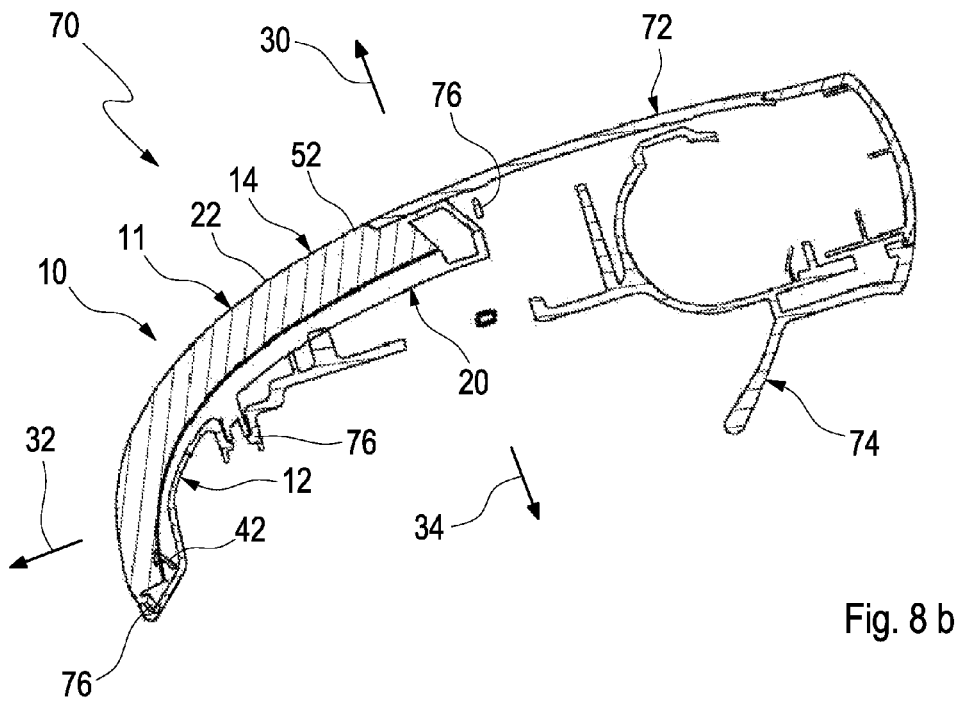
Figure 9:
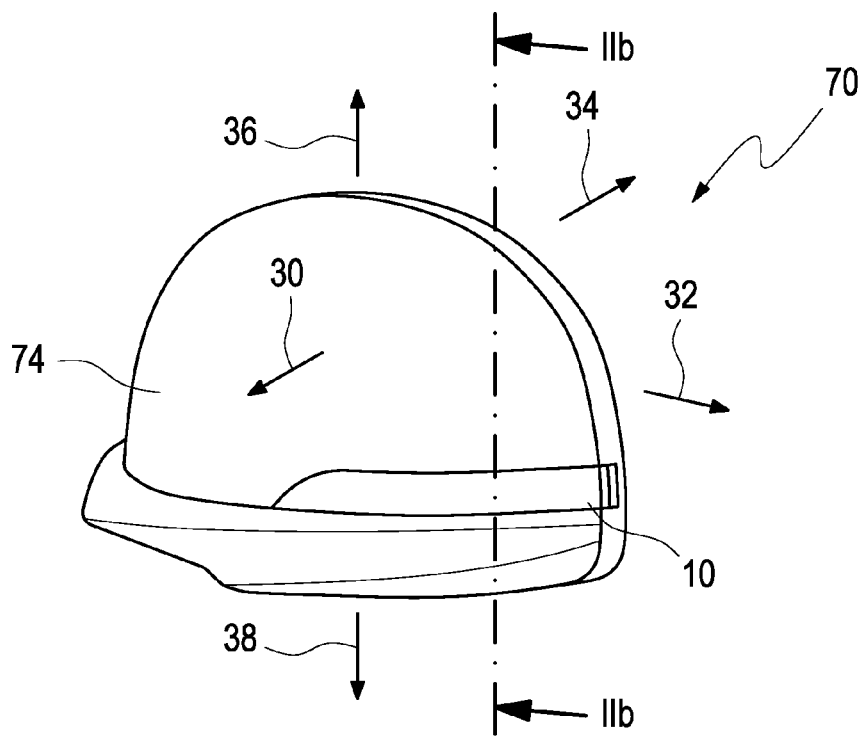
FIG. 9a, 9b a second perspective view (FIG. 9a) of the second example embodiment and a cross-sectional cut through the preferred mirror assembly (FIG. 9b)
Figure 9:
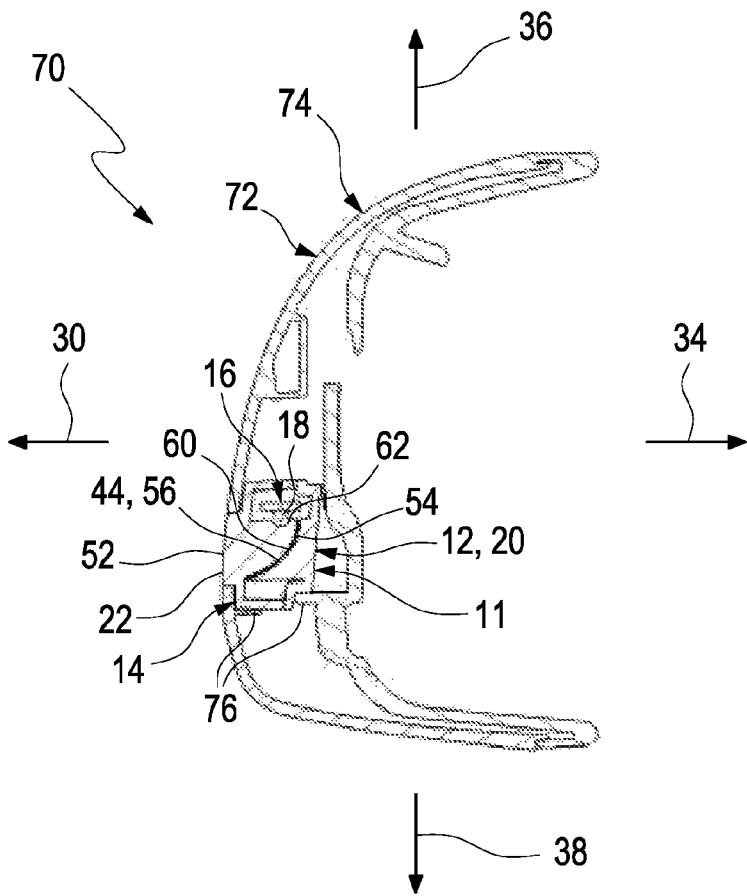
Figure 10:
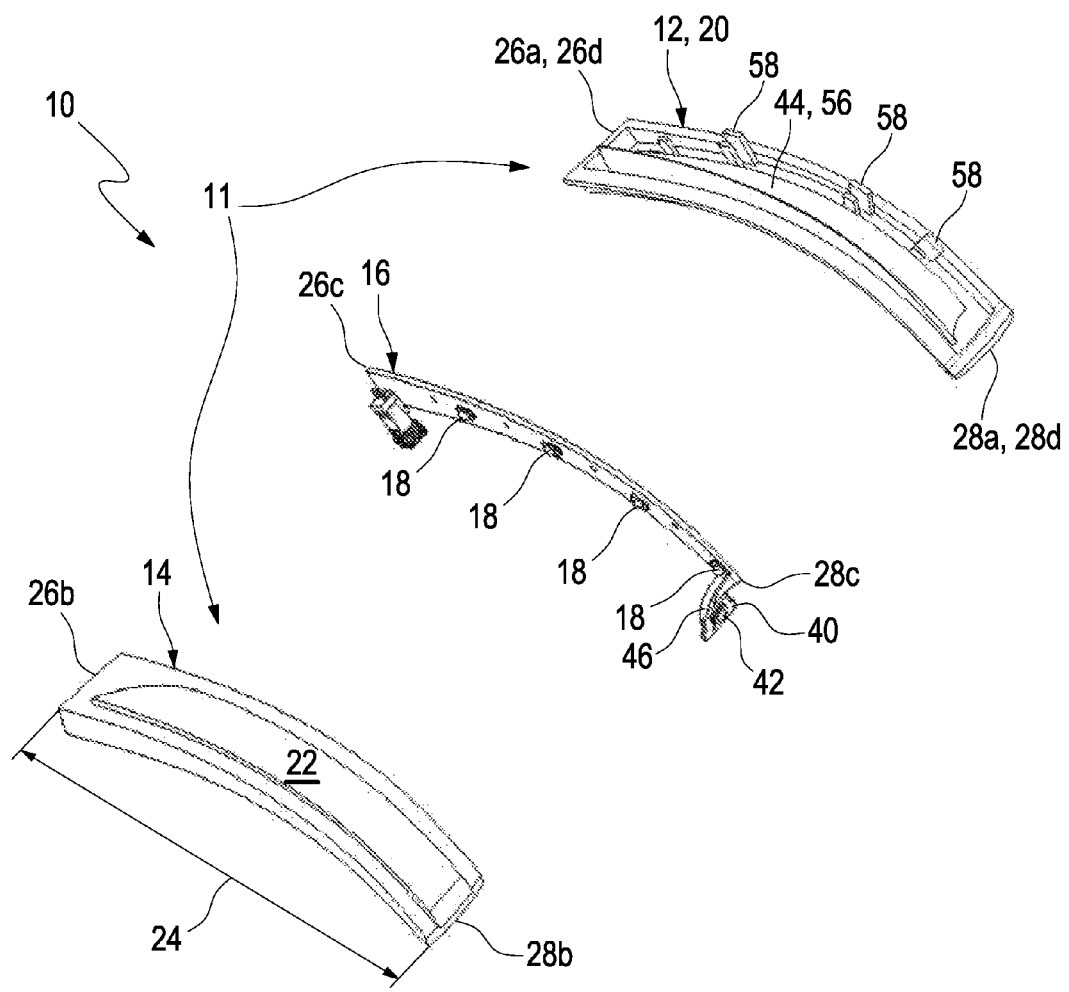
FIG. 10a-10c different exploded views from different directions of an assembly sequence of the second example embodiment of a turn-indicator light module according to the invention.
Figure 11:
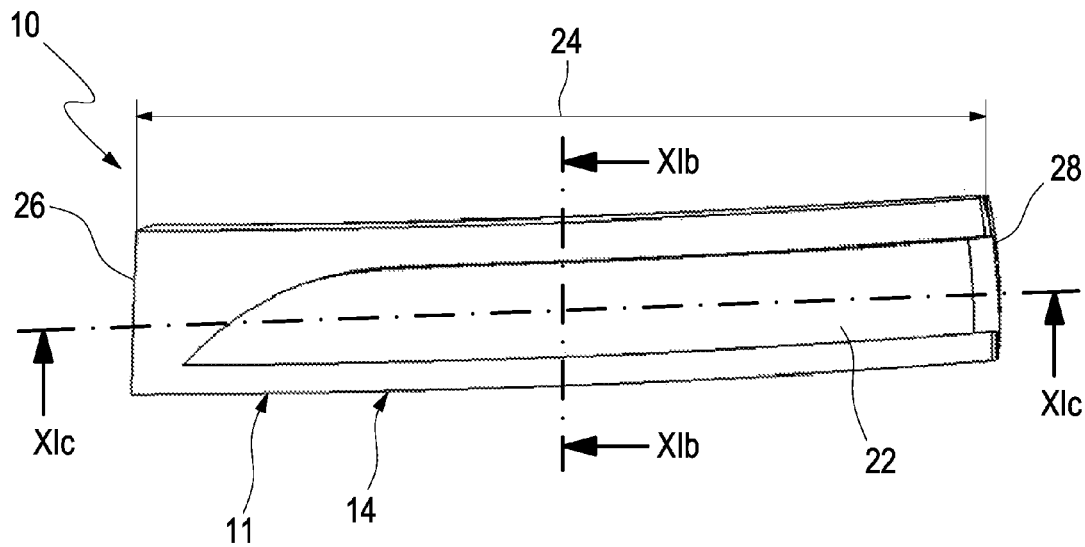
FIG. 11a-11c a perspective front view (FIG. 11a.), a cross-sectional cut (FIG. 11b) and a longitudinal cut (FIG. 11c) of the second example embodiment of a turn-indicator light module according to the invention.
Figure 11:
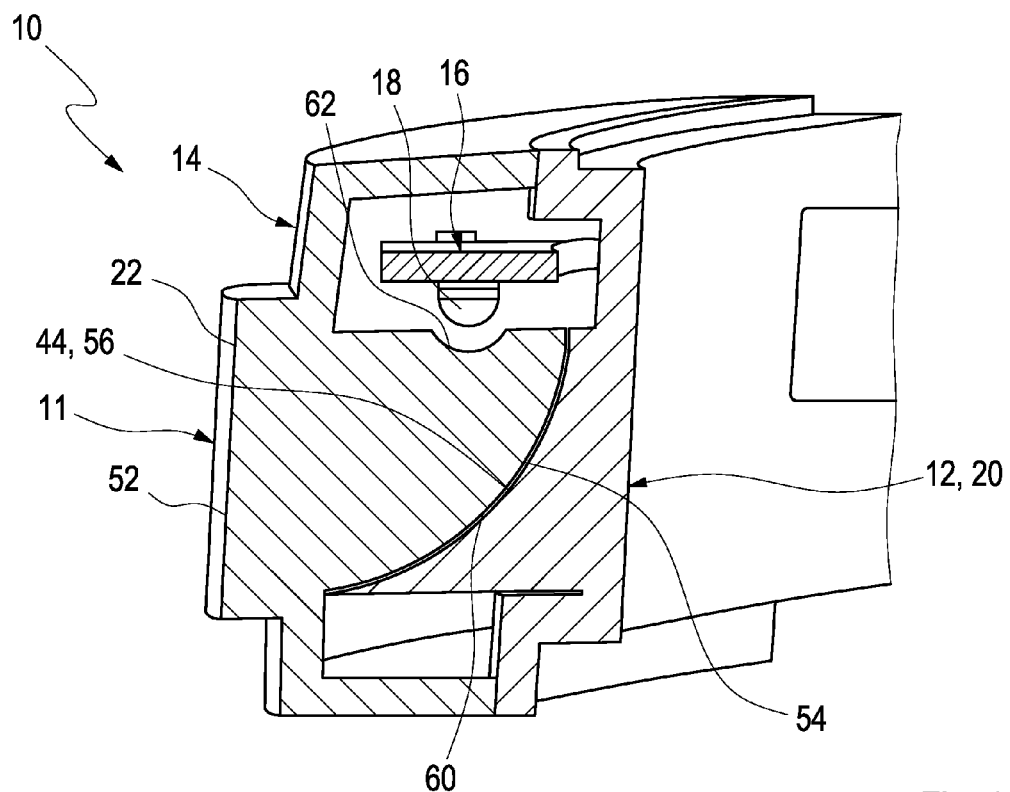
Figure 11:
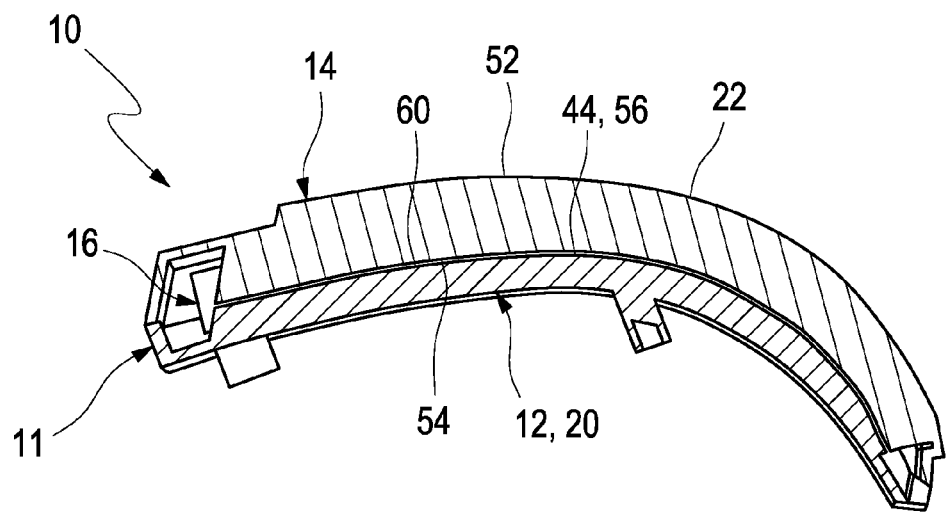

FIGS. 7a, 7b depicts a schematic representation of light emission of the external rear view mirror assembly 70 comprising a turn-indicator light module according to the first example embodiment of the invention in a zoomed view (FIG. 7a) and in a top view (FIG. 7b). The indirectly emitted light rays 68 point in driving direction 30 in a generally forward direction. A small portion of the light can leave the external rear view mirror assembly 70 in generally downward direction as directly emitted light rays 69. As can be seen in FIG. 7b, the additional light emitting source 42 irradiates light rays 66 in the sideways direction 32.

FIG. 8a to FIG. 12 illustrate various views of a second example embodiment according to the invention.

FIGS. 8a, 8b shows a perspective view (FIG. 8a) of the second example embodiment of a rear view mirror assembly 70 according to the invention with turn-indicator light module 10 and a longitudinal cut through said rear view mirror assembly 70 (FIG. 8b). Most elements have already been explained in detail in conjunction with the first embodiment. In order to avoid unnecessary repetitions, it is referred to the description above for those elements which are not described here in detail. Particularly, the focus of the following description is on the differences between the embodiments.

Compared to the first embodiment, the second embodiment has a thick lens or light pane portion 22 (in the following called lens portion) which virtually fills the empty space between the outer surface 52 of the lens portion 22 and the reflector unit 20.

FIGS. 9a, 9b display another perspective view (FIG. 9a) of the second embodiment of the rear view mirror assembly 70 and a cross-sectional cut through the rear view mirror assembly 70 (FIG. 9b). The lens portion 22 fills the empty space between the outer surface 52 of the lens portion 22 and the reflecting surface 44 of the reflector unit 20 leaving only a small air gap 60 between the inner surface 54 of the lens portion 22 and an inner surface 56 of the reflector unit 20. The reflector unit 20 is made of massive material like the lens portion 22. Either the inner surface 54 of the lens portion 22 or the inner surface 56 of the reflector unit 20 may by metallized for acting as reflecting surface 44.

The lens portion 22 has a recess 62 for each light emitting source 18. Light from the light emitting source 18 enters into the lens portion 22 and is reflected from the reflecting surface 44 in the desired direction.

The reflector unit 20 may now be integral part of the rear housing unit 12 which is also illustrated in FIGS. 10a-10c. FIGS. 10a-10c depict different exploded views from different directions of an assembly sequence of the of the turn-indicator light module 70 according a second example embodiment of the invention.

FIGS. 11a-11c show a perspective front view (FIG. 11a.), a cross-sectional cut (FIG. 11b) and a longitudinal cut (FIG. 11c) of the embodiment of the of the turn-indicator light module 70 according the second example embodiment of the invention clearly showing the recess 62 in the lens portion 22 for coupling the light of the light emitting source 18 into the lens portion 22.

Figure 12:
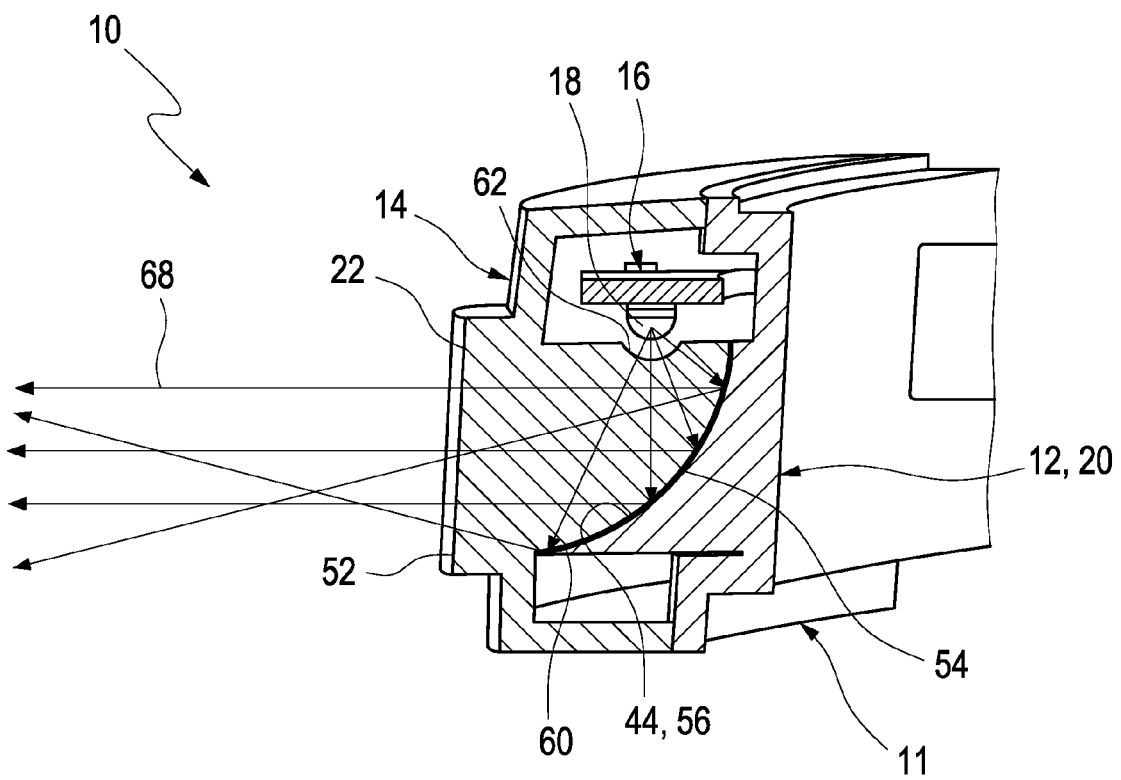
FIG. 12 a schematic representation of light emission of the second example embodiment of a turn-indicator light module according to the invention.

FIG. 12 illustrates a schematic representation of light emission of the turn-indicator light module 70 according a second example embodiment of the invention, indicating the indirectly emitted light rays 68 which are emitted from the light emitting source 18 and reflected at the reflecting surface 44.

We claim:

1. A turn-indicator light module for an external rear view mirror assembly having an outer contour, said turn-indicator light module comprising:
   a rear housing unit including at least one reflector unit and a front housing unit including a lens portion having an inner surface, whereby at least a major portion of a longitudinal extension between a first end and a second end opposite of said first end of said rear housing unit, front housing unit, and reflector unit follows a portion of the outer contour in driving direction of the external rear view mirror assembly, wherein the inner surface of said lens portion of said front housing unit and said inner reflecting surface of said rear housing unit define an uniform gap between both surfaces;
   a printed circuit board having a light emitting source mounted thereon, said printed circuit board with said light emitting source is arranged with respect to said reflector unit to emit light indirectly by light reflection of the reflector unit along the major portion of said longitudinal extension through the lens portion of the front housing unit in the driving direction and to a sideward direction, wherein the lens portion includes at least one cavity in which a light emitting source extends for optical coupling of light emitting source with lens portion to provide a uniform light dispersion toward the driving direction and independently towards the side direction of the vehicle; and
   at least one separate light emitting source provided for directly emitting light in the sideward direction for indicating a turning intend to pedestrians and crossing vehicles, such that the signaling effect in the sideward direction is increased, and said turn-indicator light module includes an elegant impression of the interior thereof wherein only a reflecting surface is visible.

2. The turn-indicator light module according to claim 1, wherein said light emitting source is a LED light source.

3. The turn-indicator light module according to claim 1, wherein said printed circuit board is mounted in the upper or lower portion of said housing and said light emitting source emits light in a downward or upward direction, respectively and wherein said reflector unit has a longitudinal bended and cross-sectional curved reflecting surface adapted to reflect light from an upward/downward direction to said driving and said sideward direction.

4. The turn-indicator light module according to claim 1, wherein at least two, preferably three to seven light emitting sources are preferably even spaced mounted particularly in a matrix type arrangement along said longitudinal extension on said printed circuit board.

5. The turn-indicator light module according to claim 1, wherein said separate light emitting source is mounted on a separate printed circuit board and electrically coupled to said printed circuit board by a wire harness.

6. The turn-indicator light module according to claim 1, wherein said reflector unit comprises a homogeneous reflecting surface or a grooved reflecting surface for an optical diffusion of the reflected light.

7. The turn-indicator light module according to claim 1, wherein the lens portion of said front housing unit fills the space between said printed circuit board and said reflector unit such that the light emitting source directly emits light into the lens portion.

8. The turn-indicator light module according to claim 7, wherein the reflector unit is integrally formed on an inner surface of said lens portion of said front housing unit.

9. The turn-indicator light module according to claim 1, wherein the reflector unit is integrally formed on an inner surface of said rear housing unit.

10. A turn-indicator light module for an external rear view mirror assembly having an outer contour, said turn-indicator light module comprising:
   a rear housing unit including at least one reflector unit and a front housing unit including a lens portion having an outside to inside transparent outer surface, or the lens portion having a semi-transparent outer surface, preferably an outer surface being coated with a chromium or aluminum plating, having a light transmittance from inside to outside between 15-50%, whereby at least a major portion of a longitudinal extension between a first end and a second end opposite of said first end of said rear housing unit, front housing unit, and reflector unit follows a portion of the outer contour in driving direction of the external rear view mirror assembly;
   a printed circuit board having a light emitting source mounted thereon, said printed circuit board with said light emitting source is arranged with respect to said reflector unit to emit light indirectly by light reflection of the reflector unit along the major portion of said longitudinal extension through the lens portion of the front housing unit in the driving direction and to a sideward direction; and
   at least one separate light emitting source provided for directly emitting light in the sideward direction for indicating a turning intend to pedestrians and crossing vehicles.

11. The turn-indicator light module according to any preceding claim, wherein said rear housing unit, said printed circuit board, said reflector unit and said front housing unit are assembled together using snap-in connectors, comprising grooves and protrusions.

12. An external rear-view mirror assembly comprising:
   a turn-indicator light module having an outer contour, comprising a rear housing unit;
   at least one or more light emitting sources mounted on one or more printed circuit boards, at least one reflector unit and a front housing unit comprising a lens portion having an inner surface, whereby at least a major portion of a longitudinal extension between a first end and a second end opposite of said first end of said rear housing unit, front housing unit, reflector unit and said one or more printed circuit boards respectively follows a portion of said outer contour in driving direction of said external rear view mirror assembly, wherein the inner surface of said lens portion of said front housing unit and said inner reflecting surface of said rear housing unit define an uniform gap between both surfaces;
   said one or more printed circuit boards with said light emitting source is arranged with respect to said reflector unit to emit light indirectly by light reflection of the reflector unit along the major portion of their longitudinal extension through the lens portion of the front housing unit to said driving direction and to a sideward direction, wherein the lens portion includes at least one cavity in which a light emitting source extends for optical coupling of light emitting source with lens portion; and
   at least one separate light emitting source which is provided for directly emitting light in said sideward direction for indicating a turning intend to pedestrians and crossing vehicles, such that the signaling effect in the sideward direction is increased, and said turn-indicator light module includes an elegant impression of the interior thereof wherein only a reflecting surface is visible.

13. The mirror assembly according to claim 12, wherein said turn-indicator light module is fixed inside a housing of said mirror assembly using snap-in connectors.

* * * * *